INVENTOR
OLIVER K. KING
by: Gary, Parker, Juettner & Cullinan
ATTYS.

April 5, 1966

O. K. KING 3,244,289

RECORD FILING DEVICE

Filed Nov. 30, 1964

3 Sheets-Sheet 2

INVENTOR
OLIVER K. KING by: Gary, Parker, Juettner & Cullinan
ATTYS.

INVENTOR
OLIVER K. KING by: Gary, Parker, Juettner & Cullinan
ATTYS.

3,244,289
RECORD FILING DEVICE
Oliver K. King, Edgewater, N.J., assignor to Acme Visible Records, Inc., Crozet, Va., a corporation of Delaware
Filed Nov. 30, 1964, Ser. No. 414,625
5 Claims. (Cl. 211—131)

This invention relates to improvements in record filing devices, and particularly to a novel rotary record file adapted for the filing of record cards.

The most generally used construction of rotatable record card filing units employs rigid compartments, particularly as to card width. This necessitates that the manufacturer offer his customer a wide variety of different units as a whole to accommodate varying card sizes. When a purchaser or user must convert his records to a new and different card size, he must abandon his existing rotary file units and purchase new units made to suit his new record form size.

It is an object of the present invention to provide a rotary record file constructed and arranged to permit adjustability whereby to enable employment of a wide variety of card sizes and also permit progressive change-over adjustment of a unit in instances where a particular record must be changed over gradually to a new form size or sizes.

In general, the device of the present invention comprises a circular disc mounted for rotation about a vertical axis, and provided with a plurality of fixedly disposed radially extending dividers and a plurality of movably mounted arcuate dividers extending in a circumferential direction and disposed between the fixed radial dividers.

In this manner, the purchaser of a rotary filing unit need only buy an original assembly and can purchase partitions needed to fit his particular record size. If the purchaser should wish to change his record form size he can purchase new partitions only and still use the same basic rotary file unit. Conversely, a single basic rotary file unit can be adapted to suit a variety of applications without necessitating the manufacturer to make or the customer to buy a separate unit for each different use or record card size.

Further objects and advantages of the present invention relate to its economies, details of construction and arrangement of parts and will be apparent from a consideration of the following specification and accompanying drawings wherein.

Figure 1:
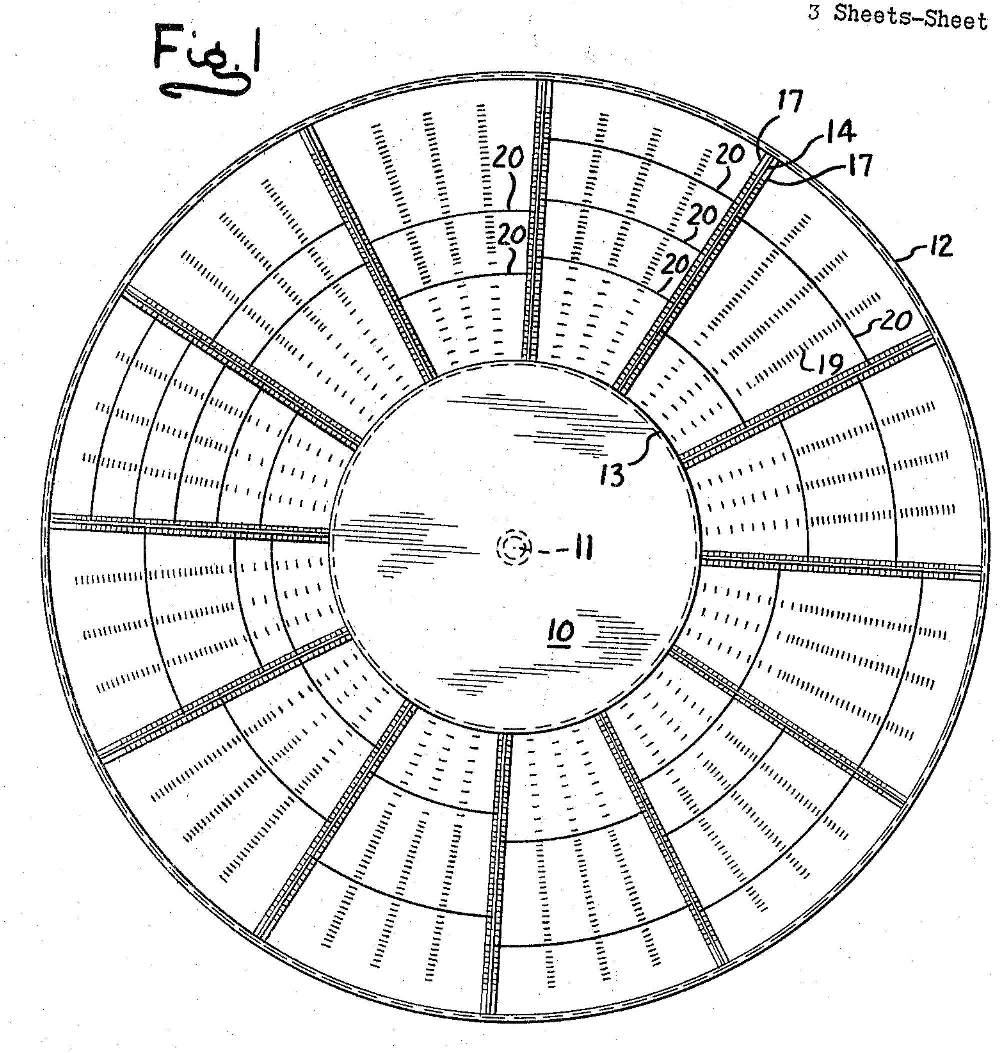
FIG. 1 is a plan view of the rotary record filing unit of the present invention.

Referring to the drawings, the reference numeral 10 indicates a circular disc, most suitably made of sheet steel, mounted to rotate about the vertical axis 11 in a well known manner. The disc 10 has secured thereto a peripheral wall in the form of a sheet metal band 12 which extends above and is perpendicular to the plane of the disc 10. A second wall or sheet metal band 13 is fixedly secured to the disc 10 concentric to the outer wall 12 and is disposed at a suitable distance inwardly from the outer band 12, determined by the maximum allowable depth at which a user may reach the innermost disposed record sheet or card.

A plurality of vertically disposed and radially extending dividers 14 are fixedly secured to the upper surface of the disc 10, preferably in a regular angularly spaced manner and between the walls or bands 12 and 13. These fixed radial dividers are further secured to the walls 12 and 13 by means of end flanges as at 15 and to the disc 10 as by means of base flanges 16.

At least one and preferably two parallel channel members 17 are fixedly secured to each side of each of the radial dividers 14, the closed base of said channels extending outwardly. Each channel member 17 is further provided with a series of spaced vertical slots 18 for the purpose of retaining movable circumferentially extending dividers as will be hereinafter more fully described.

The disc 10 is further provided with radial rows of spaced arcuate slots 19, these slots extending circumferentially, and the adjacent radial rows of slots lying on concentric circles and being disposed between each pair of radially extending fixed dividers 14.

Arcuate partitions 20 having straight ends 21 are provided with downwardly extending tongues 22, the tongues being adapted to be received in the slots 19 and the straight ends 21 in the slots 18 of channels 17.

Since the distance between each pair of fixed dividers 17 decreases in a direction from the outer wall 12 to the inner wall 13, the dividers 17 can receive progressively shorter movable arcuate dividers 20 and thus accommodate progressively smaller width cards or other record sheets between an adjacent pair of dividers 20.

These various sized movable partitions 20 can be manufactured in quantity and each size required kept in stock by the manufacturer, enabling the purchaser or user of the rotary file unit to purchase partitions needed to fit his particular record card width. If the purchaser should wish to change his record form width he can then purchase new partitions only and still use the same basic rotary file. These partitions 20 are simple in construction and economical to manufacture and therefore a purchaser or user can change over his rotary file to suit various form sizes at a fraction of the original cost of the complete file unit. Conversely, the manufacturer can realize savings by being able to furnish the same basic rotary file unit to serve a variety of uses and not have to custom design complete different units for each different application.

Figure 2:
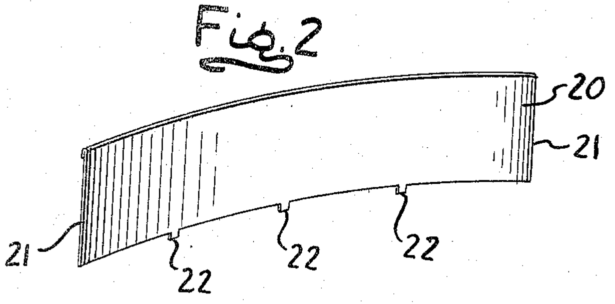
FIG. 2 is a perspective view of one of its removable arcuate dividers adapted to be disposed circumferentially between two radially extending fixed dividers.
Figures 3, 4, 5:
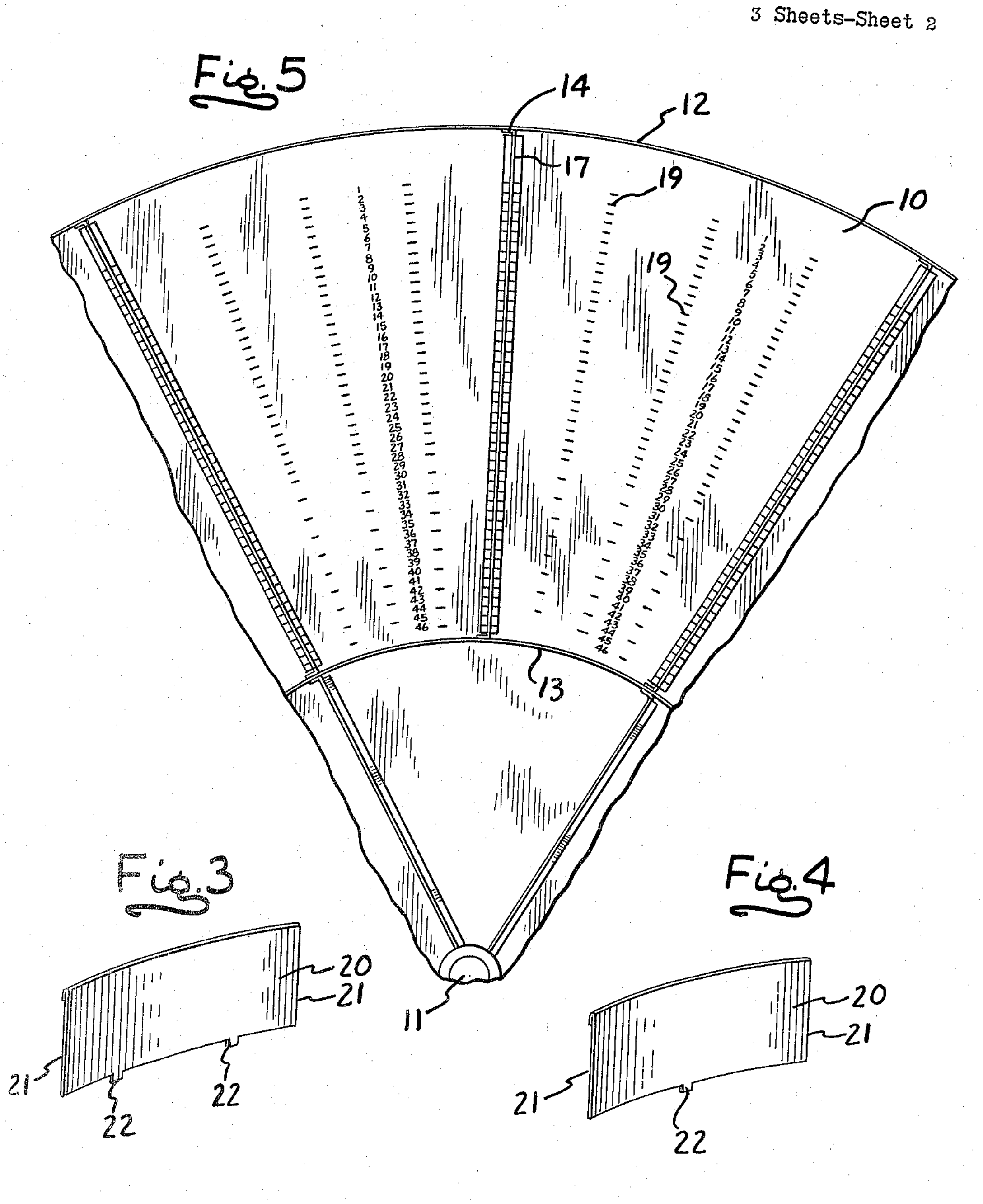
FIGS. 3 and 4 are perspective views of similar arcuate dividers of respectively shorter arc.
FIG. 5 is a fragmentary relatively enlarged plan view of the disc of FIG. 1.
Figure 6:
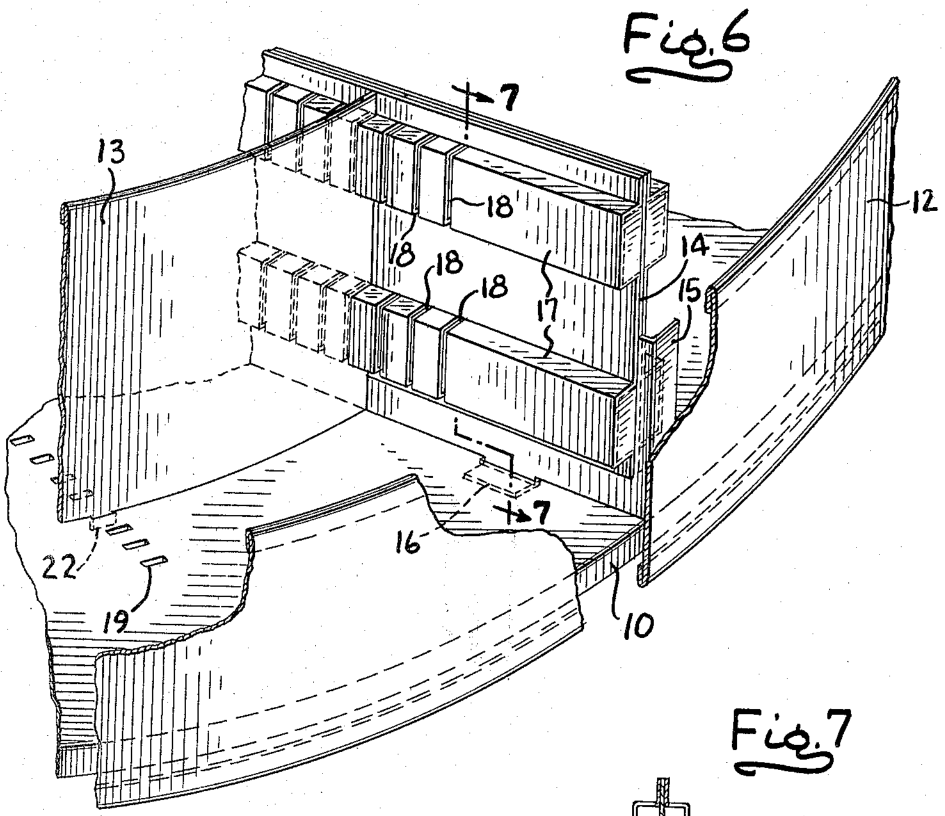
FIG. 6 is a fragmentary perspective side elevational view of the disc of the present invention.
Figure 7:
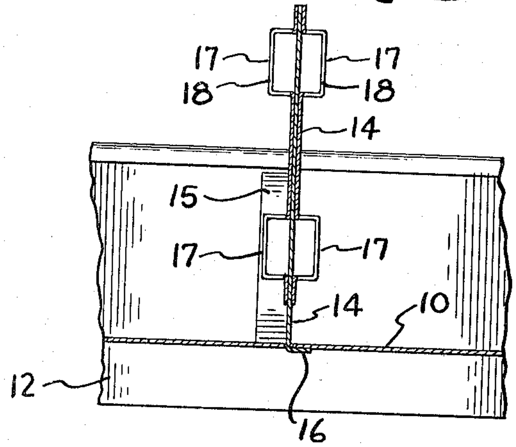
FIG. 7 is a section on the line 7—7 of FIG. 6.

As shown in FIGS. 3 and 4, as the arc of the units 20 becomes progressively smaller, lesser numbers of tongues 22 can be employed. Thus with the form shown in FIG. 2, three tongues 22 are provided to fit into each of the three rows of slots 19, whereas with the shorter form unit 20 shown in FIG. 3, two tongues 22 will suffice, whereas with the still shorter divider shown in FIG. 4, a single tongue 22 is adequate. It will be understood,, however, that in either of the forms shown in FIGS. 2, 3 and 4, one or more downwardly depending tongues 22 can be employed.

Thus as shown in FIG. 1, the arcuate circumferentially extending dividers 20 may be disposed at various desired spacings to provide receptacles of desired width and depth to suit various conditions of usage and record card or sheet sizes.

Although I have shown and described the preferred embodiment of my invention it will be understood by those skilled in the art that changes may be made in the details thereof without departing from its scope as comprehended by the following claims.

I claim:

1. A record filing device comprising a horizontally disposed disc, a plurality of radially extending dividers fixedly secured thereto, a plurality of partitions disposed between adjacent dividers and separably engaged therebetween.

2. A record filing device comprising a horizontally disposed rotatably mounted disc, a plurality of radially extending equi-spaced dividers fixedly secured to said disc, and a plurality of partitions disposed between adjacent dividers and separably engaged therebetween to said dividers and to said disc.

3. A record filing device comprising a horizontally disposed rotatably mounted disc, a plurality of spaced radially extending dividers fixedly secured to said disc, a plurality of arcuately extending partitions disposed between adjacent dividers, means on said partitions engageable with means formed on said disc, and means carried by said dividers for engagement of said partitions.

4. A record filing device comprising a horizontally disposed rotatably mounted disc, a plurality of spaced radially extending vertically disposed dividers fixedly secured to said disc, a plurality of arcuately and vertically extending partitions disposed between adjacent dividers, slotted members carried by the sides of said dividers and endwise receiving said partitions, and tongues extending from the lower ends of said partitions received in slots formed in said disc.

5. A record filing device comprising a horizontally disposed rotatably mounted disc, a peripheral wall secured to said disc, a concentric inner wall secured to said disc, a plurality of spaced radially extending dividers fixedly secured to said disc between said walls, slotted members carried by the sides of said dividers, a plurality of arcuately extending partition members carried by said disc and extending between adjacent dividers and endwise received in their said slotted members in substantially parallel relationship to and between said walls.

References Cited by the Examiner

UNITED STATES PATENTS

| | | | |
|---|---|---|---|
| 936,287 | 10/1909 | Antilotti | 129—16 |
| 1,712,177 | 5/1929 | Guthrie-Strachan | 129—16 |
| 2,081,856 | 5/1937 | Frick | 211—131 |
| 2,411,950 | 12/1946 | Yzetta | 211—133 |
| 2,711,741 | 6/1955 | Wassell | 129—16 |

CLAUDE A. LE ROY, *Primary Examiner.*

J. F. FOSS, *Assistant Examiner.*